United States Patent
McCurdy

(10) Patent No.: US 6,340,928 B1
(45) Date of Patent: Jan. 22, 2002

(54) EMERGENCY ASSISTANCE SYSTEM USING BLUETOOTH TECHNOLOGY

(75) Inventor: Roger A. McCurdy, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/599,981

(22) Filed: Jun. 22, 2000

(51) Int. Cl.$^7$ ................................................. B60Q 1/00
(52) U.S. Cl. .................... 340/436; 340/438; 340/903
(58) Field of Search ..................... 340/425.5, 426, 340/436, 438, 988, 990, 995; 180/273; 280/735; 455/404; 343/711, 712, 713

(56) References Cited

U.S. PATENT DOCUMENTS

| | | | |
|---|---|---|---|
| 5,330,226 A | | 7/1994 | Gentry et al. ................ 280/735 |
| 5,513,244 A | | 4/1996 | Joao et al. ................ 340/425.5 |
| 5,515,043 A | * | 5/1996 | Berard et al. ............... 340/988 |
| 5,555,286 A | * | 9/1996 | Tendler ....................... 455/404 |
| 5,670,853 A | | 9/1997 | Bauer .......................... 180/273 |
| 5,687,215 A | * | 11/1997 | Timm et al. ................ 455/404 |
| 5,742,666 A | | 4/1998 | Alpert ........................ 340/426 |
| 5,748,473 A | | 5/1998 | Breed et al. ................ 280/735 |
| 5,781,101 A | | 7/1998 | Stephen et al. ........ 340/286.02 |
| 5,805,057 A | | 9/1998 | Eslaminovin ............... 340/426 |
| 5,829,782 A | | 11/1998 | Breed et al. ................ 280/735 |
| 5,835,873 A | | 11/1998 | Darby et al. .................. 701/45 |
| 5,848,661 A | | 12/1998 | Fu .............................. 180/273 |
| 5,914,675 A | | 6/1999 | Tognazzini ................. 340/989 |
| 5,969,598 A | | 10/1999 | Kimura ....................... 340/436 |
| 6,005,958 A | | 12/1999 | Farmer et al. .............. 340/438 |
| 6,023,241 A | | 2/2000 | Clapper ................. 342/357.13 |
| 6,028,764 A | | 2/2000 | Richardson et al. ........ 361/681 |
| 6,069,588 A | * | 5/2000 | O'Neill, Jr. ................. 343/713 |
| 6,218,929 B1 | * | 4/2001 | Furuta et al. ................ 340/5.1 |

OTHER PUBLICATIONS

A paper entitled "Bluetooth—The Universal Radio Interface for Ad Hoc, Wireless Connectivity", by Jaap Haartsen, Ericsson Review No. 3, 1998, pp. 110–117 cited in the O'Neill Jr. Patent No. 6,069,588.

http://www.bluetooth.com/text/blue . . . intro.asp?action=bt4u&sort=mobcomp (page 1 of 1), dated Apr. 5, 2000.

http://www.bluetooth.com/text/blue . . . ntro.asp?action=bt4u&sor=mobphone (page 2 of 2) dated Apr. 5, 2000.

wysiwyg://3//http://www.bluetooth.com/bluetoothguide/faq/8.asp (pp. 1–3), dated May 10, 2000.

http://www.bluetooth.com/text/blue . . . uide/intro/intro.asp?action=future (page 1 of 1), dated Apr. 5, 2000.

http://www.bluetooth.com/text/bluetoothguide/scenarios/scenarios.asp (page 1 of 2), dated Apr. 5, 2000.

http://www.bluetooth.com/text/blue . . . o/intro.asp?action=bt4u&sort=other (page 1 of 1), dated Apr. 5, 2000.

wysiwyg:/44/http://www.bluetooth.com/bluetoothguide/faq/1.asp (pp. 1–3), dated Mar. 27, 2000.

(List continued on next page.)

Primary Examiner—Van T Trieu
(74) Attorney, Agent, or Firm—Tarolli, Sundheim, Covell, Tummino & Szabo L.L.P.

(57) ABSTRACT

An emergency assistance system (10) that transmits vehicle and occupant information to an emergency station (26) in the event of a vehicle crash condition. The system (10) includes a vehicle crash sensing system (40) that senses the vehicle crash condition and transmits a crash signal through a first port (42) using Bluetooth™ technology. A cellular phone (12) having GPS (30) receives the crash signal through a second port (32) using Bluetooth™ technology, which in turn is coupled to a controller (16) within the cellular phone (12). In response to receipt of the crash signal, the controller (16) enables the cellular phone (12) to initialize a telephone call to the emergency station (26) and to transmit a signal to the emergency station (26) identifying the current location of the vehicle and the vehicle condition.

12 Claims, 1 Drawing Sheet

OTHER PUBLICATIONS http://www.bluetooth.com/text/bluetoothguide/scenarios/scenarios.asp (page 2 of 2), dated Apr. 5, 2000.

http://www.bluetooth.com/text/bluetoothguide/intro/intro.asp?action=cis (page 1 of 1), dated Apr. 5, 2000.

http://www.bluetooth.com/text/bluetoothguide/intro/intro.asp?action=sas (page 1 of 1), dated Apr. 5, 2000.

http://www.bluetooth.com/text/bluetoothguide/intro/intro.asp (page 1 of 1), dated Apr. 5, 2000.

http://www.bluetooth.com/text/blue . . . ro/intro.asp?action=bt4u&sort=wire (page 1 of 1), dated Apr. 5, 2000.

http://www.bluetooth.com/text/blue . . . ntro.asp?action=bt4u&sort=handheld (page 1 of 1), dated Apr. 5, 2000.

wysiwyg://7/http://www.bluetooth.com/news/signal/1999/3_18.asp (pp. 1–2), dated Apr. 5, 2000.

http://www.gsmdata.com/artblue.htm (pp. 1–5), dated May 17, 2000.

wysiwyg://47/http://www.bluetooth.com/news/signal/1999/2_9.asp (pp. 1–3), dated Apr. 13, 2000.

wysiwyg://4//http://www.bluetooth.com/news/signal/1999/3_14.asp (p. 1–2), dated Apr. 5, 2000.

Telephony Control Protocol Specification, dated Nov. 29, 1999.

* cited by examiner

EMERGENCY ASSISTANCE SYSTEM USING BLUETOOTH TECHNOLOGY

TECHNICAL FIELD

The present invention relates to an emergency assistance system. More particularly, it relates to a system that implements Bluetooth™ technology in an airbag crash sensor and in a cellular phone to communicate with an emergency rescue station.

BACKGROUND OF THE INVENTION

Emergency assistance systems are known for transmitting vehicle information and for tracking and locating vehicles. Commercial monitoring systems require on board GPS (i.e., global positioning systems) and a hardwired phone built into the vehicle to relay status conditions to a monitoring station resulting in monthly service charges for the monitoring service. Thus, it is desirable for an emergency assistance system that does not require a hardwire phone and does not incur monthly service charges.

U.S. Pat. No. 5,914,675 describes a type of emergency system in a vehicle. Upon detecting a crash situation, the vehicle crash sensor activates an on board GPS which, in turn, activates the vehicle's hardwired phone to initiate a telephone call to a base station. During the telephone call, the emergency system sends vehicle information, such as vehicle crash data, vehicle identification, vehicle condition, and vehicle location information to the base station.

U.S. Pat. No. 5,515,043 describes an emergency assistance system using a hardwired telephone and a GPS system for vehicle tracking. In the event of a crash, a vehicle crash sensor activates the telephone and automatically calls emergency units.

SUMMARY OF THE INVENTION

In accordance with the present invention, in the event of a vehicle crash condition, an apparatus and method are provided for automatically activating a wireless phone using Bluetooth™ technology. Once activated, the wireless phone transmits vehicle and occupant information to an emergency rescue station.

In accordance with one aspect of the present invention, an apparatus includes a vehicle crash sensing system including a first port using Bluetooth™ technology to transmit a crash signal indicative of a vehicle sensed crash condition, and a cellular phone including a second port using Bluetooth™ technology to receive the crash signal and to enable wireless communications between the cellular phone and an emergency station in response to receipt of the crash signal.

In accordance with another aspect of the present invention, a method for communicating a vehicle emergency condition includes the steps of sensing a vehicle crash condition, transmitting a vehicle crash signal indicative of a sensed vehicle crash condition through a first port using Bluetooth™ technology, receiving the crash signal through a second port using Bluetooth™ technology in a cellular phone, and enabling wireless communications between the cellular phone and an emergency station in response to receipt of the crash signal.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DESCRIPTION OF PREFERRED EMBODIMENT

Figure 1:
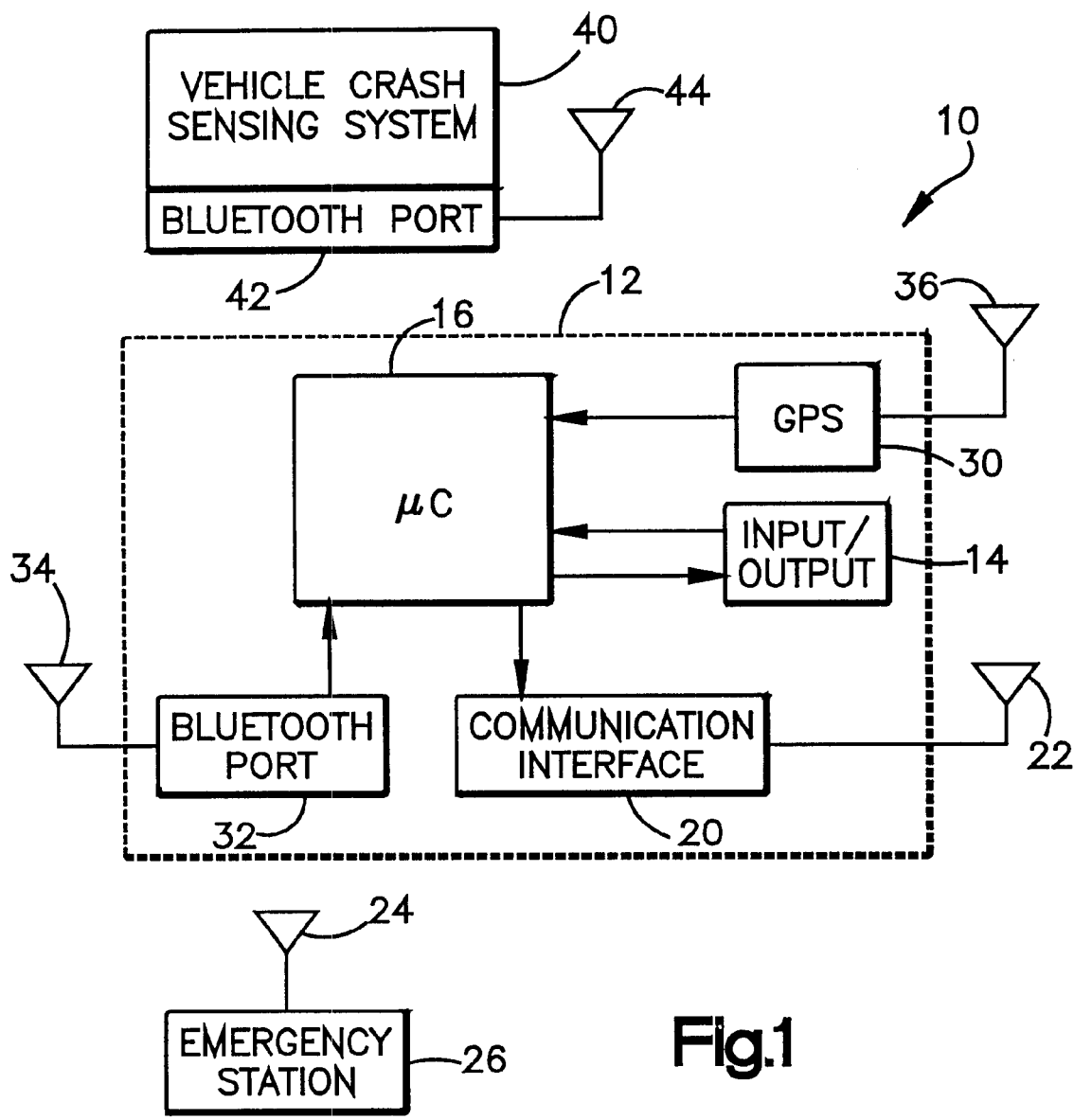
FIG. 1 is a schematic diagram of an emergency assistance apparatus, in accordance with the present invention.

Referring to FIG. 1, an exemplary embodiment of an emergency assistance system 10, in accordance with the present invention, is shown. The system 10 includes a vehicle crash sensing system 40 of a type well known in the art. The sensing system 40 includes a crash sensor (not shown) for sensing a vehicle crash condition. From a crash sensor output signal, the system 40 determines a crash metric value (e.g. crash acceleration, crash velocity, crash displacement, etc.) and uses the crash metric value in a crash algorithm to determine if a deployment crash condition is occurring, i.e., a crash condition in which an actuatable restraint would be actuated. The crash sensing system 40 also senses and stores occupant information, such as occupant identification, weight, number of occupants, etc.

The system 10 further includes a portable device, such as a cellular phone 12. The cellular phone 12 includes an input/output circuit 14 including a microphone to send and receive voice signals to a controller 16. Circuit 14 would also include a keypad. A person of ordinary skill in the art will appreciate that the controller 16 can take several forms including a combination digital or analog circuits or packaged as an application specific integrated circuit (ASIC).

The cellular phone 12 further includes a communication interface 20 operatively connected to the controller 16. The communication interface 20 allows for communication between the controller 16 and an emergency station 26 via an antenna 22. The communication interface 20 permits analog, digital, and/or modem communications with the emergency station 26 or any other cellular device or interface, e.g., other cellular phones, base stations, etc.

Further, the emergency system 10 includes an automatic position locating system (i.e., a global positioning system ("GPS")) 30. The GPS 30 and associated antenna 36 are integrated as part of the cellular phone 12 and operatively connected to the controller 16. The GPS 30 determines vehicle position information in a manner well known in the art.

A Bluetooth™ wireless connectivity port 32 (i.e., radio link) is included in the cellular phone 12 and another Bluetooth™ port 42 is included in the crash sensing system 40 to transmit data between the system 40 and phone 12, particularly during a vehicle crash event. Bluetooth™ 32, 42 is a commercially available short-range, cable replacement, radio link technology.

Bluetooth™ 32, 42 operates in a multi-user environment to allow wireless communication between a cellular phone, a computer, and other personal electronic devices within a specific radius of each other. Devices 12, 40 are set up so that they can automatically exchange encoded information with one another using the Bluetooth™ technology.

Upon detecting a vehicle crash condition, the vehicle crash sensing system 40 sends a signal indicative of the crash condition through the Bluetooth™ port 42 to the Bluetooth™ port 32 in the cellular phone 12 via respective antennas 44, 34. The signal received from the crash sensing system 40 wakes-up (i.e., activates, if necessary) the cellular phone 12 and instructs the phone 12 to automatically dial the telephone number of the emergency station 26 previously stored in memory (not shown).

The controller 16 formats a data string to be transmitted to the emergency station 26 using a modem signal via the communication interface 20. The data string includes vehicle occupant information, crash severity, and type of crash received from system 40 as well as vehicle position determined by GPS 30. Once communication is established between the cellular phone 12 and the emergency station 26, the controller 16 transmits the data string through the communication interface 20 to the emergency station 26.

It should be appreciated that the present system can use any cellular phone having the Bluetooth™ port. No hard wired phone is needed in the vehicle. As long as a vehicle operator has his portable cellular phone with him, the phone would be functional in any vehicle designed in accordance with the present invention.

Although the foregoing has been applied to a vehicle occupant protection system, various modifications and changes thereto can be made by persons skilled in the art to apply the present invention to home devices (e.g., garage door, windows, coffee pot). Also, additional information may be made available to the emergency station, such as weight of the occupants, size of the occupants, photo imaging of the vehicle interior, presence of an infant seat, etc., or any additional information received over a vehicle CAN bus, such as vehicle speed and door lock/unlock conditions.

From the above description of the invention, those skilled in the art will perceive improvements, changes and modifications. For example, the GPS could be part of the cellular phone or could be part of the vehicle's electronic system or the vehicle crash sensing system 40. Such improvements, changes and modifications within the skill of the art are intended to be covered by the appended claims.

Having described the invention, the following is claimed:

1. An emergency assistance apparatus, comprising:

a vehicle crash sensing system including a first port using BLUETOOTH technology to transmit a vehicle crash signal indicative of a vehicle sensed crash condition; and a portable cellular phone, transportable in or located near the vehicle, including a second port using BLUETOOTH technology to receive said crash signal and to enable wireless communications between said portable cellular phone and an emergency station in response to receipt of said crash signal.

2. The apparatus of claim 1, wherein said second port is coupled to a controller of said portable cellular phone.

3. The apparatus of claim 2, wherein said portable cellular phone further includes a communication interface coupled to said controller to transmit vehicle occupant information and vehicle information received from said vehicle crash sensing system to said emergency station.

4. The apparatus of claim 2, wherein said portable cellular phone further includes a microphone coupled to said controller to provide voice signals between said emergency station and an occupant.

5. The apparatus of claim 2, wherein said portable cellular phone further includes a GPS coupled to said controller to transmit a vehicle location signal to said emergency station.

6. An emergency assistance apparatus, comprising:

a vehicle crash sensing system for determining a vehicle crash condition and transmitting a crash signal through a first port using BLUETOOTH technology; and a portable cellular phone, transportable in or located near the vehicle, including:

(i) a controller;

(ii) a second port using BLUETOOTH technology coupled to said controller to receive said crash signal and to enable said portable cellular phone to initialize a telephone call to an emergency station in response to receipt of said crash signal;

(iii) a GPS coupled to said controller to provide said controller with vehicle position information;

(iv) a communication interface coupled to said controller for transmitting vehicle crash condition information and vehicle position information to said emergency station; and (v) a microphone coupled to said controller and providing voice signals between said emergency station and said vehicle occupant.

7. A method for communicating a vehicle emergency condition, comprising the steps of:

sensing a vehicle crash condition;

transmitting a vehicle crash signal indicative of a sensed vehicle crash condition through a first port using BLUETOOTH technology;

receiving said crash signal through a second port using BLUETOOTH technology in a portable cellular phone transportable in or located near the vehicle; and enabling wireless communications between said portable cellular phone and an emergency station in response to receipt of said crash signal.

8. The method of claim 7, further including the step of coupling said second port to a controller in said portable cellular phone.

9. The method of claim 8, further including the step of sensing occupant information and vehicle information and transmitting the sensed occupant information and the vehicle information to said emergency station using a communication interface included in said portable cellular phone and coupled to said controller.

10. The method of claim 8, further including the step of providing voice signals between said emergency station and an occupant using a microphone included in said portable cellular phone and coupled to said controller.

11. The method of claim 8, further including the steps of sensing vehicle location via GPS and transmitting the vehicle location to said emergency station through said portable cellular phone.

12. A method for emergency assistance, comprising the steps of:

determining the occurrence of a vehicle crash condition;

transmitting a vehicle crash signal through a first port in an airbag crash sensor using BLUETOOTH technology in response to a determined crash condition;

receiving the crash signal through a second port using BLUETOOTH technology in a portable cellular phone transportable in or located near the vehicle;

determining present vehicle location;

initializing a telephone call from said portable cellular phone to an emergency station in response to receiving the crash signal;

transmitting vehicle condition and location to said emergency station; and providing voice signals between said emergency station and said vehicle occupant.

* * * * *